(12) United States Patent
Tran

(10) Patent No.: US 11,954,491 B2
(45) Date of Patent: *Apr. 9, 2024

(54) MULTI-THREADING MICROPROCESSOR WITH A TIME COUNTER FOR STATICALLY DISPATCHING INSTRUCTIONS

(71) Applicant: Simplex Micro, Inc., San Jose, CA (US)

(72) Inventor: Thang Minh Tran, Tustin, CA (US)

(73) Assignee: Simplex Micro, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/697,870

(22) Filed: Mar. 17, 2022

(65) Prior Publication Data

US 2023/0244491 A1 Aug. 3, 2023

Related U.S. Application Data

(63) Continuation-in-part of application No. 17/672,622, filed on Feb. 15, 2022, now Pat. No. 11,829,767, and a continuation-in-part of application No. 17/588,315, filed on Jan. 30, 2022, now Pat. No. 11,829,187.

(51) Int. Cl.
*G06F 9/38* (2018.01)
*G06F 1/14* (2006.01)

(52) U.S. Cl.
CPC .............. *G06F 9/3836* (2013.01); *G06F 1/14* (2013.01)

(58) Field of Classification Search
CPC ........................... G06F 9/3836; G06F 9/30145
See application file for complete search history.

(56) References Cited

U.S. PATENT DOCUMENTS

| 5,021,985 A | 6/1991 | Hu et al. |
| 5,185,868 A | 2/1993 | Tran |
| 5,251,306 A | 10/1993 | Tran |
| 5,655,096 A | 8/1997 | Branigin |
| 5,699,536 A | 12/1997 | Hopkins et al. |
| 5,799,163 A | 8/1998 | Park et al. |
| 5,802,386 A | 9/1998 | Kahle et al. |

(Continued)

FOREIGN PATENT DOCUMENTS

| EP | 0840213 A2 | 5/1998 |
| EP | 0959575 A1 | 11/1999 |

(Continued)

OTHER PUBLICATIONS

Choi, W., Park, SJ., Dubois, M. (2009). Accurate Instruction Prescheduling in Dynamically Scheduled Processors. In: Stenstrom, P. (eds) Transactions on High-Performance Embedded Architectures and Compilers I. Lecture Notes in Computer Science, vol. 5470 Springer, Berlin, Heidelberg. pp. 107-127. (Year: 2009).

(Continued)

*Primary Examiner* — Zachary K Huson
(74) *Attorney, Agent, or Firm* — Appleton Luff

(57) ABSTRACT

A multithread processor includes a time counter and a register scoreboard and provides a method for statically dispatching instructions with preset execution times based on a write time of a register in the register scoreboard and the time counter provided to an execution pipeline.

23 Claims, 5 Drawing Sheets

(56) References Cited

U.S. PATENT DOCUMENTS

| | | |
|---|---|---|
| 5,809,268 A | 9/1998 | Chan |
| 5,835,745 A | 11/1998 | Sager et al. |
| 5,860,018 A | 1/1999 | Panwar |
| 5,881,302 A | 3/1999 | Omata |
| 5,958,041 A | 9/1999 | Petolino, Jr. et al. |
| 5,961,630 A | 10/1999 | Zaidi et al. |
| 5,964,867 A | 10/1999 | Anderson et al. |
| 5,996,061 A | 11/1999 | Lopez-Aguado et al. |
| 5,996,064 A | 11/1999 | Zaidi et al. |
| 6,016,540 A | 1/2000 | Zaidi et al. |
| 6,035,393 A | 3/2000 | Glew et al. |
| 6,065,105 A | 5/2000 | Zaidi et al. |
| 6,247,113 B1 | 6/2001 | Jaggar |
| 6,282,634 B1 | 8/2001 | Hinds et al. |
| 6,304,955 B1 | 10/2001 | Arora |
| 6,425,090 B1 | 7/2002 | Arimilli et al. |
| 6,453,424 B1 | 9/2002 | Janniello |
| 7,069,425 B1 | 6/2006 | Takahashi |
| 7,434,032 B1 | 10/2008 | Coon et al. |
| 8,166,281 B2 | 4/2012 | Gschwind et al. |
| 9,256,428 B2 | 2/2016 | Heil et al. |
| 11,132,199 B1 | 9/2021 | Tran |
| 11,144,319 B1* | 10/2021 | Battle .................. G06F 9/3012 |
| 11,163,582 B1 | 11/2021 | Tran |
| 11,204,770 B2 | 12/2021 | Tran |
| 11,263,013 B2 | 3/2022 | Tran |
| 2001/0004755 A1 | 11/2001 | Levy et al. |
| 2003/0135712 A1 | 7/2003 | Theis |
| 2006/0010305 A1 | 1/2006 | Maeda et al. |
| 2006/0095732 A1 | 5/2006 | Tran et al. |
| 2006/0218124 A1 | 9/2006 | Williamson et al. |
| 2006/0259800 A1 | 11/2006 | Maejima |
| 2006/0288194 A1* | 12/2006 | Lewis .................. G06F 9/3869 712/220 |
| 2007/0260856 A1 | 11/2007 | Tran et al. |
| 2011/0099354 A1 | 4/2011 | Takashima et al. |
| 2011/0320765 A1 | 12/2011 | Karkhanis et al. |
| 2012/0047352 A1 | 2/2012 | Yamana |
| 2013/0151816 A1 | 6/2013 | Indukuru et al. |
| 2013/0346985 A1* | 12/2013 | Nightingale ........ G06F 15/7871 718/102 |
| 2014/0082626 A1 | 3/2014 | Busaba et al. |
| 2015/0227369 A1 | 8/2015 | Gonion |
| 2016/0092238 A1 | 3/2016 | Codrescu et al. |
| 2016/0371091 A1 | 12/2016 | Brownscheidle et al. |
| 2017/0357513 A1 | 12/2017 | Ayub et al. |
| 2018/0196678 A1 | 7/2018 | Thompto |
| 2020/0004543 A1 | 1/2020 | Kumar et al. |
| 2020/0387382 A1 | 12/2020 | Tseng et al. |
| 2021/0026639 A1 | 1/2021 | Tekmen et al. |
| 2023/0068637 A1 | 3/2023 | Feiste et al. |

FOREIGN PATENT DOCUMENTS

| | | |
|---|---|---|
| WO | 0010076 A1 | 2/2000 |
| WO | 0213005 A1 | 2/2002 |

OTHER PUBLICATIONS

Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).

Written Opinion of the International Searching Authority, PCT/S2022/052185.

Written Opinion of the International Searching Authority, PCT/US2023/018970.

Written Opinion of the International Searching Authority, PCT/US2023/018996.

PCT/US23/27497: Written Opinion of the International Searching Authority.

* cited by examiner

Read Control (62)

| Time | V | Reg |
|---|---|---|
| 63 | 0 | x0 |
| 62 | 0 | x0 |
| ... | 1 | x27 |
| 27 | 1 | x11 |
| 26 | 1 | x7 |
| 25 | 1 | x27 |
| ... | 1 | x5 |
| 2 | 0 | x0 |
| 1 | 0 | x0 |
| 0 | 0 | x0 |

↑ time count

FIG. 4A

Write Control (64)

| Time | V | Reg |
|---|---|---|
| 63 | 0 | x0 |
| 62 | 0 | x0 |
| ... | 1 | x25 |
| 28 | 1 | x14 |
| 27 | 1 | x22 |
| 26 | 1 | x9 |
| ... | 1 | x5 |
| 2 | 0 | x0 |
| 1 | 0 | x0 |
| 0 | 0 | x0 |

↑ time count

FIG. 4B

MULTI-THREADING MICROPROCESSOR WITH A TIME COUNTER FOR STATICALLY DISPATCHING INSTRUCTIONS

BACKGROUND

Related Applications

This application is a continuation-in-part of and claims priority to U.S. patent application Ser. No. 17/588,315, filed Jan. 30, 2022, and entitled "Microprocessor with Time Counter for Statically Dispatching Instructions," which application is hereby incorporated by reference in its entirety, and this application is also a continuation-in-part of and claims priority to U.S. patent application Ser. No. 17/672,622, filed Feb. 15, 2022, and entitled "Register Scoreboard for A Microprocessor with a Time Counter for Statically Dispatching Instructions," which application is hereby incorporated by reference in its entirety.

TECHNICAL FIELD

The present invention relates to the field of computer processors. More particularly, it relates to issuing and executing instructions based on a time count in a processor where the processor consists of a general-purpose microprocessor, a digital-signal processor, a single instruction multiple data processor, a vector processor, a graphics processor, or other type of microprocessor which executes instructions.

TECHNICAL BACKGROUND

Processors have become increasingly complex chasing small increments in performance at the expense of power consumption and semiconductor chip area. The approach in out-of-order (OOO) superscalar microprocessors has remained basically the same for the last 25-30 years, with much of the power dissipation arising from the dynamic scheduling of instructions for execution from reservation stations or central windows. Designing an OOO superscalar microprocessor is a huge undertaking. Hundreds of different instructions can be issued to the execution pipeline where the data dependencies must be resolved and arbitrated for execution by a large number of functional units. The result data from the functional units must be again arbitrated for the write buses to write back results to the register file. If the data cannot be written back to the register file, then the result data are kept in temporary registers and a complicated stalling procedure needs to be performed for the execution pipeline. The number of instructions issuing per clock cycle reaches saturation where issuing more instructions per clock cycle is more costly in area and power than the increase in performance. Two alternatives to improving performance are providing multiple processor cores or providing multi-threading capability. Multithreading is the ability of a processor to provide multiple threads of execution concurrently, supported by the operating system. Multithreading can be implemented in a multi-core processor. In a typical multi-threaded implementation, the threads of execution run fully parallel and share the resources of a single core. The resources include the functional units, the caches, as well as other portions of the processor.

Multithreading is usually more efficient with resource sharing and has a corresponding higher utilization of resources, but it is more difficult to implement in an OOO superscalar microprocessor. If dynamic scheduling of instruction execution is used, multithreading adds another level of complexity by requiring arbitration of instructions executing on each thread.

An alternative to OOO superscalar processors is very-long-instruction-word (VLIW) processors. These have diminished interest in the industry because of the need for a complex compiler and their relatively weak performance.

Thus, there is a need for a multithreaded OOO superscalar microprocessor which consumes less power, has a simpler design, and is scalable with consistently high performance.

SUMMARY

The disclosed embodiments provide a register scoreboard for a processor with a time counter and a method of using the register scoreboard for statically dispatching instructions to an execution pipeline with preset execution times based on a time count from the counter. The time counter provides a time count representing a specified time of the processor and is incremented periodically. An instruction issue unit is coupled to the time counter and receives instructions from a thread, then issues those instructions with a preset execution time based on the time count. An execution queue also receives the time count and receives the instructions from the thread, then dispatches the instructions to a functional unit when the time count reaches the preset execution time.

A disclosed approach to microprocessor design employs static scheduling of instructions. A disclosed static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependencies, (2) availability of read buses to read data from the register file, (3) availability of a functional unit to execute the instruction, and (4) availability of a write bus to write result data back to the register file. In one embodiment a multithreaded processor is implemented where multiple independent streams of instructions are fetched to an issue and execution pipeline. The static scheduling issues instructions independent of threads as long as the above four conditions are met.

The four conditions above are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file.

In one embodiment, a time counter increments every clock cycle and the resulting count is used to statically schedule instruction execution. Instructions have known throughput and latency times, and thus can be scheduled for execution based on the time count. For example, an add instruction with throughput and latency time of 1 can be scheduled to execute when any data dependency is resolved. If the time count is 5 and the add has no data dependency at time 8, then the available read buses are scheduled to read data from the register file at time 8, the available arithmetic logic unit (ALU) is scheduled to execute the add instruction at time 9, and the available write bus is scheduled to write result data from ALU to the register file at time 9. The add instruction is dispatched to the ALU execution queue with the preset execution times. The read buses, the ALU, and the write bus are scheduled to be busy at the preset times. The maximum time count is designed to accommodate the largest future time to schedule execution of instruction. In some embodiments, the time count is 64 and no instruction can be scheduled to execute more than 64 cycles in the future.

Multithreading is a model of program execution that allows for multiple threads to be created within a process, executing independently but concurrently sharing process resources. Each thread has its own register file, state and status registers, and program counter. In one embodiment, the thread register files are incorporated into a larger physical register file as part of a register renaming algorithm. In the register renaming algorithm, data dependencies are resolved for all registers regardless of threads and the static scheduling is applied to all instructions regardless of threads. With static scheduling of instructions based on the time count, the instructions are issued and executed independent of threads, the complexity of dynamic scheduling is eliminated, the arbitration of resources and threads are reduced, and the hundreds of comparators for data dependency are eliminated. The basic out-of-order execution of instructions is the same as in a conventional single threaded out of order execution processor, but statically scheduling of instructions with a time count is more efficient. The elimination of the extra components means the processor consumes less power. Instructions are efficiently executed out-of-order with preset times to retain the performance compared to traditional dynamic approaches. The number of issued instructions is scalable from scalar to superscalar.

BRIEF DESCRIPTION OF THE DRAWINGS

Aspects of the present invention are best understood from the following description when read with the accompanying figures.

FIGS. 4A and 4B are block diagrams illustrating a read bus control and a write bus control.

DETAILED DESCRIPTION

Figure 1:
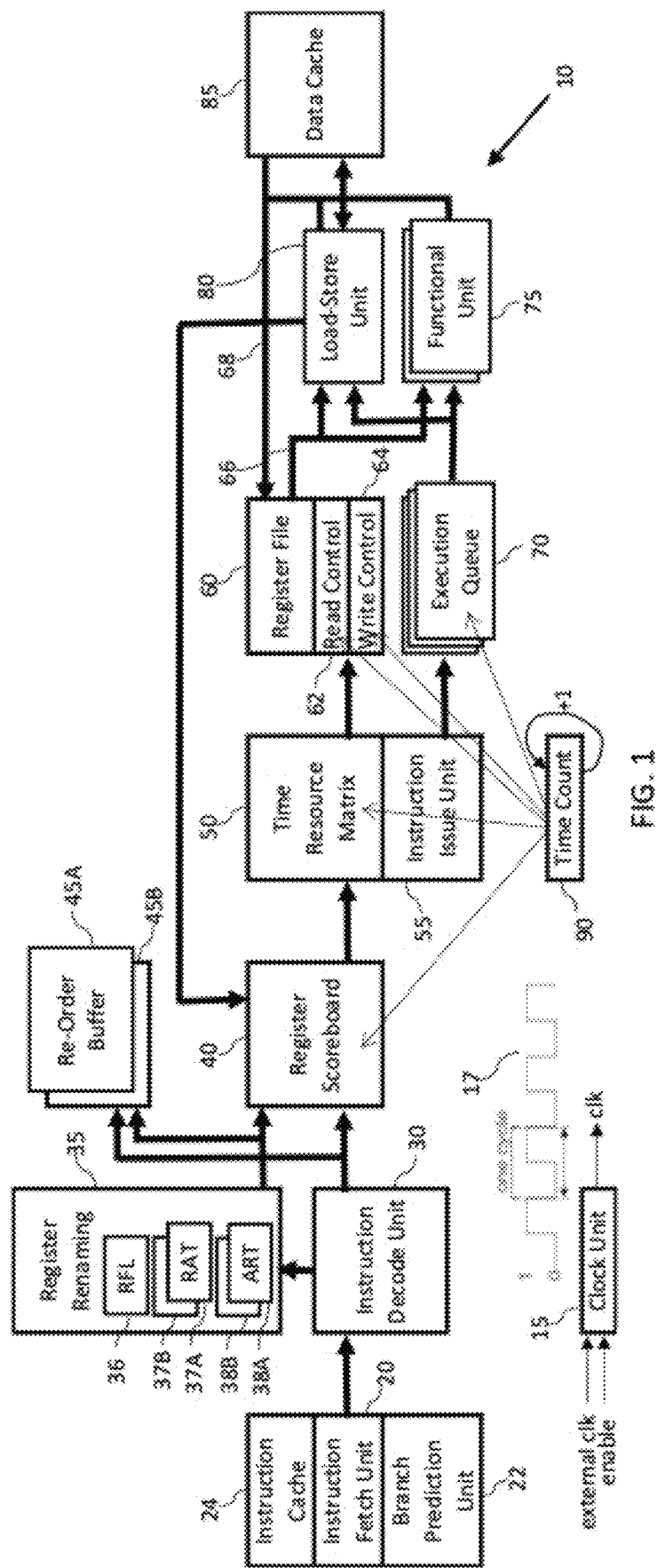
FIG. 1 is a block diagram illustrating a processor based data processing system in accordance with a preferred embodiment of the present invention.

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment, a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have the throughput time of 1 and latency time of 3 (based on a data cache hit), and the divide instruction have throughput and latency times of 32.

FIG. 1 is a block diagram of a multithreaded microprocessor based data processing system. The exemplary system includes a microprocessor 10 having a clock unit 15, an instruction fetch unit 20, an instruction cache 24, a branch prediction unit 22, an instruction decode unit 30, a register renaming unit 35, a register scoreboard 40, re-order buffers 45A and 45B, a time-resource matrix 50, an instruction issue unit 55, a register file 60, a read control unit 62, a write control unit 64, a plurality of execution queues 70, a plurality of functional units 75, a load-store unit 80, and a data cache 85. The microprocessor 10 includes a plurality of read buses 66 connecting the register files to the functional units 75 and load-store unit 80. The system also includes a plurality of write buses 68 to write result data from the functional unit 75, the load-store unit 80, and the data cache 85 to the register file 60. The re-order buffer is duplicated for each thread of the multithreaded processor, as an example, 2 threads are used in the description below, but implementations may support any number of threads. The reference numbers for the re-order buffers 45A and 45B, the register alias tables 37A and 37B, and the architectural register tables 38A and 38B are simplified to 45, 37, and 38 in the description for brevity. Microprocessor 10 is a synchronous microprocessor where the clock unit generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 enables synchronization of the many different units and states in the microprocessor 10. The clock signal is used to sequence data and instructions through the units that perform the various computations in the microprocessor 10. The clock unit 15 may include an external clock as input to synchronize the microprocessor 10 with external units (not shown). The clock unit 15 may further include an enable signal to disable the clock unit when the microprocessor is in idle stage or not use for instruction execution.

According to an embodiment the microprocessor 10 also includes a time counter unit 90 which stores a time count incremented, in one embodiment, every clock cycle. The time counter unit 90 is coupled to the clock unit 15 and uses "clk" signal to increment the time count.

In one embodiment the time count represents the time in clock cycles when an instruction in the instruction issue unit 55 is scheduled for execution. For example, if the current time count is 5 and an instruction is scheduled to be execute later in 22 cycles, then the instruction is sent to the execution queue 70 with the execution time count of 27. When the time count increments to 26, the execution queue 70 issues the instruction to the functional unit 75 for execution in the next cycle (time count 27). The time counter unit 90 is coupled to the register scoreboard 40, the time-resource matrix 50, the read control 62, the write control 64, and the plurality of execution queues 70.

The scoreboard 40 resolves data dependencies in the instructions. The time-resource matrix 50 checks availability of the various resources, which in one embodiment include the read buses 66, the functional units 75, the load-store unit 80, and the write buses 68. The read control unit 62, the write control unit 64, and the execution queues 70 receive the scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time. The execution queue 70 is set to dispatch an instruction to a functional unit 75 or the load-store unit 80 at a preset time. In each case, the preset time is the time determined by the decode/issue unit 30. The preset time is a future time that is based on the time count, so when the time count counts up to the preset time, then the specified action will happen. The specified action can be reading data from the register file, writing data to the register file, issuing an instruction to a functional unit for execution, or some other action. The decode/issue unit 30 determines when an instruction is free of data dependencies and the resource is available. This allows it to set the "preset time" for the instruction to be executed in the execution pipeline.

In the microprocessor system 10, the instruction fetch unit 20 fetches the next instruction(s) from the instruction cache 24 to send to the instruction decode unit 30. In one embodiment, the multithreaded microprocessor 10 keeps a program counter (not shown) for each thread. For each thread, the instruction fetch unit 20 fetches the next instruction(s) from the instruction cache 24 to send to the instruction decode unit 30. One or more thread bit(s) are attached to each instruction for identification of the thread to which the instruction corresponds. Different algorithms of alternating thread instructions may be used to send instructions to the instruction decode unit 30. In one embodiment, the threads use a round robin algorithm to dispatch a number of instructions of one thread per cycle from the instruction fetch unit 20 to the instruction decode unit 30. The number of instructions per cycle can vary and is dependent on the number of instructions per cycle supported by the processor. In one embodiment, the thread re-order buffer 45 may send a signal to stall sending instructions for a particular thread. One or more instructions can be fetched per clock cycle by the instruction fetch unit depending on the configuration of microprocessor 10. For higher performance, microprocessor 10 fetches more instructions per clock cycle for the instruction decode unit 30. For low-power and embedded applications, microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit 20 is also coupled to the branch prediction unit 22 for prediction of the next instruction address when a branch is detected and predicted by the branch prediction unit 22. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

The instruction decode unit 30 is coupled to the instruction fetch unit 20 for new instructions and also coupled to the register renaming unit 35 and the register scoreboard 40. The instruction decode unit 30 decodes the instructions for instruction type, instruction throughput and latency times, and the register operands. The register operands, for example, may consist of 2 source operands and 1 destination operand. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution.

Other data dependencies for the instructions include the write-after-write (WAW) and write-after-read (WAR). The WAW data dependency occurs when 2 instructions write back to the same destination register. The WAW dependency restricts the later instruction from writing back to the same destination register before the earlier instruction is written to it. To address the WAW dependency, every destination register is renamed by the register renaming unit 35 where the later instruction is written to a different register from the earlier register, thus eliminating the WAW data dependency. For example, if three instructions have the same destination register R5, and which are renamed to R37, R68, R74 then the three instructions can write to the destination register at any time. Without renaming, all three instructions will try to write to the same register R5 which is a WAW dependency in that the third instruction cannot write to R5 before the second instruction, which cannot write to R5 before the first instruction.

The register renaming unit 35 also eliminates the WAR data dependency where the later instruction cannot write to a register until the earlier instruction reads the same register. Since the destination register of the later instruction is renamed, the earlier instruction can read the register at any time. In such an embodiment, as the destination registers are renamed, the instructions are executed out-of-order and written back to the renamed destination register out-of-order. The register scoreboard 40 is used to keep track of the completion time of all destination registers. In a preferred embodiment the completion time is maintained in reference to the time count 90.

In one embodiment, the register renaming unit 35 consists of a register free list (RFL) 36, a register alias table (RAT) 37, and an architectural register table (ART) 38. In a multithreaded embodiment, the RAT 37 and the ART 38 are duplicated for each thread as shown in FIG. 1 as 37A and 37B, and 38A and 38B. In one embodiment, two threads with the 32-entry architectural registers have 64 temporary registers for renaming, for a total of 128 physical registers, referred to as the register file 60. The thread architectural registers are mapped into the physical register file 60 in which the issue and execute pipelines of the microprocessor 10 use to execute instructions based on the registers in register file 60 without any reference to threads. In the above-described embodiment, register scoreboard 40 keeps the write back time for the 128 physical registers. The register scoreboard 40 is associated with the physical register file 60. The RFL 36 keeps track of temporary registers (64 registers in this example) which have not been used. As the destination register of an instruction is renamed, a free-list register is used for renaming. The register alias table 37 stores the latest renamed registers of the architectural registers. For example, if register R5 is renamed to the temporary register R52, then the register alias table 37 keeps the renaming of R5 to R52. Thus, any source operand which references to R5 will see R52 instead of R5. As the architectural register R5 is renamed to R52, eventually when register R52 is retired, the architectural register R5 becomes R52 as stored in the architectural register table 38. The RAT 37A keeps track of the architectural register renaming for the first thread which will eventually retire to the architectural register table 38A. The register alias table 37B keeps track of the architectural register renaming for the second thread which will eventually retire to the architectural register table 38B. The register scoreboard 40 indicates the earliest time for availability of a source register of the register file 60, independently of any thread.

In one embodiment, if instructions are executed out-of-order, then the re-order buffer 45 is needed to ensure correct program execution. The re-order buffer 45 is duplicated as 45A and 45B for two threads of the microprocessor 10. The register renaming 35 and the instruction decode unit 30 are coupled to the re-order buffer 45 to provide the order of issued instructions and the latest renaming of all architectural registers. The re-order buffer 45 is needed to retire the instructions in order regardless of when the instructions are executed and written back to the register file 60. In one embodiment, re-order buffer 45 takes the form of a first in first out (FIFO) buffer. Inputs are instructions from the decode unit 30 and instructions are retired in order after completion by the functional unit 75 or the load store unit 80. In particular, the re-order buffer 45 flushes all instructions after a branch misprediction or instruction exception. The ART 38 is updated only with the instructions before a branch misprediction or instruction exception. Another function of the re-order buffer 45 is writing data to memory only in accordance with the order of the load and store execution. The data memory (including data cache 85 and external memory) should be written in order by retiring of the store instructions from the re-order buffer 45. Retiring of store instructions is performed in order for each thread, so the store buffer (not shown) in the load store unit 80 is duplicated for each thread.

Each of the units shown in the block diagram of FIG. 1 can be implemented in integrated circuit form by one of ordinary skill in the art in view of the present disclosure. [register transfer logic] With regard to one embodiment of this invention, time counter 90 is a basic N-bit wrap-around counter incrementing by 1 every dock cycle. The time-resource matrix 50 is preferably implemented as registers with entries read and written as with a conventional register structure.

The integrated circuitry employed to implement the units shown in the hock diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagram of FIG. 1 can be implemented as software representations, for example in a hardware description language (such as for example Verilog) that describes the functions performed by the units of FIG. 1 at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory computer readable storage medium and include instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions.

Figure 2:
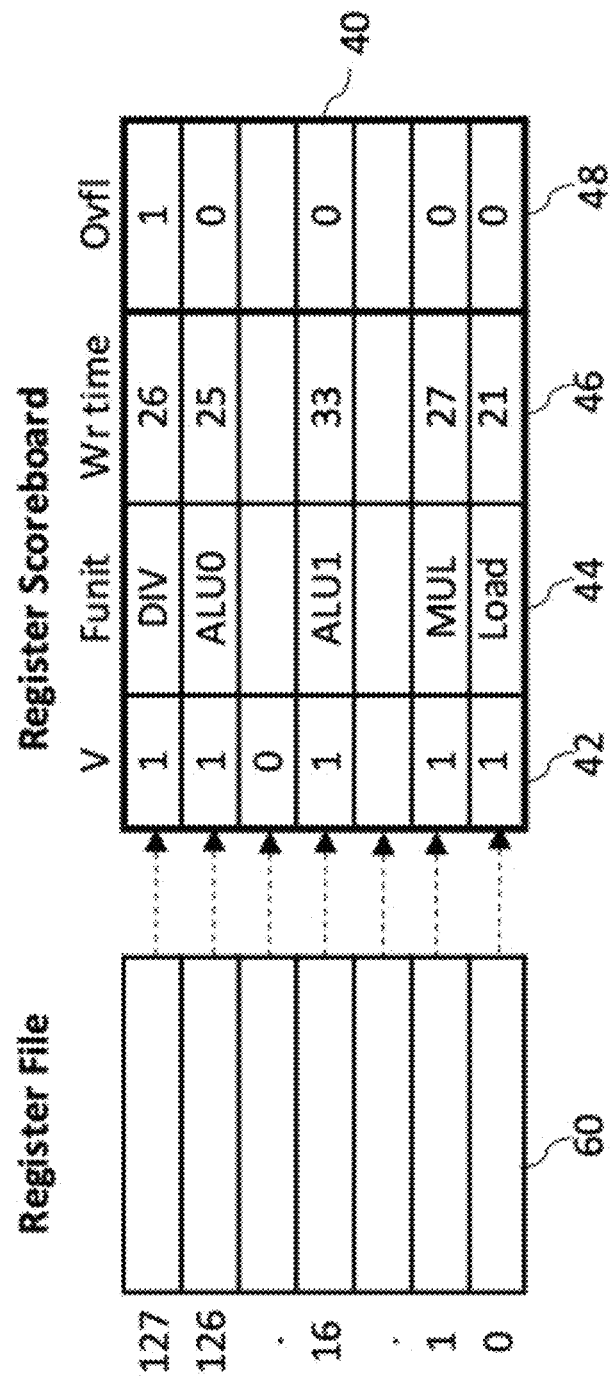
FIG. 2 is a block diagram illustrating a register file and a register scoreboard.

FIG. 2 illustrates further details of the register file 60 and the register scoreboard 40. In one embodiment, the register file 60 has 128 registers, numbered as registers 0 to 127 as illustrated. The register file 60 consists of all physical registers of the processor 10. Each register in the register file 60 has a corresponding entry in the register scoreboard 40. The register scoreboard 40 stores the pending write status for the registers 60. A valid bit field 42 indicates a valid write back to the register file 60 at a future time in reference to the time count 90, as specified by the write time field 46 from a specific functional unit in the "Funit" field 44. As examples, illustrated in FIG. 2, register 0 is written back at time count 21 from the load-store unit 80. Register 1 is written back at time count 27 from the multiply unit (one of the functional units 75). Register 16 is written back at time count 33 from the ALU1, (another of the functional units 75), etc. The write time 46 is the time in reference to the time count 90. The result data is written to the register file 60. The data is not available from the register file 60 until the next clock cycle, but the result data can be forwarded from the corresponding functional unit 44 in the register scoreboard 40. For example, if the value of the time count 90 is 19, then the load-store unit 80 produces the result data in 2 clock cycles at time count 21 for writing back to the register file 60.

The write back time from the functional unit is based on the known latency time of an instruction. The latency time of a load instruction is not fixed. The latency time of a load instruction can be unpredictable as the load data may not be in the data cache 85. For a data cache miss, the data must be fetched from external memory as described above. In such a situation, the write back time in the scoreboard 40 for the destination register of a load instruction will no longer correct. If processor 10 is implemented with a level 2 cache (not shown), then the latency time for a level 2 cache hit can be used to update the register scoreboard 40.

The write time of a destination register is the read time for the subsequent instruction with RAW data dependency on the same destination register. Referring back to FIG. 1, the source registers of an instruction in the instruction decode unit 30 access the register scoreboard 40 for the corresponding read times. If the valid bit 42 of a source register is not set in the register scoreboard 40, then the data in the register file 60 can be accessed at any time providing availability of the read buses 66, otherwise the write time 46 is the earliest time to issue the instruction. The write time 46 is when the result data from the functional unit 75 or the load store unit 80 are on the write bus 68 to the register file 60. The result data from write bus 68 can be forwarded to read bus 66 so that the result data is available on the read bus 66 in the same clock cycle in which it is written to the register file 60. In one embodiment, the "Funit" field 44 indicates which functional unit will write back to the register file 60, and the designated functional unit can restrict the aforementioned forwarding to the read bus 66 due to the presence of a critical timing path. For example, the data from the data cache is a critical timing path in which case forwarding is performed, in one embodiment, to only the ALUs. If the issued instruction is multiply, then the write time 46 from load store unit 80 should be incremented by 1 to be used as the read time for the multiply instruction. In such an instance, the multiply instruction reads the data from the register file 60 one cycle after the load data is written to the register file 60. Forwarding of data from the data cache 85 to the ALU is normal and is the same as forwarding of any functional unit to any functional unit, while forwarding of data from data cache 85 to multiply unit is not allowed. As an example, when the ALU instruction reads the register 0 of the register scoreboard 40 in FIG. 2, the write time 46 of 21 is used as the read time as data can be forwarded from the data cache 85 onto read bus 66. When the multiply instruction reads the same register 0 of the register scoreboard 40 in FIG. 2, the read time of 22 is used to read data from the register file 60 as the data from data cache 85 are written into the register file 60 in cycle 21. This same restriction is kept and does not permit the read control unit 62 to forward the load data from the data cache 85 to the multiply unit.

An instruction reads source operand data at read time, executes the instruction with a functional unit 75 at execute time, and writes the result data back to the register file 60 at write time. The write time is recorded in the write time field 46 of the register scoreboard 40. With 2 source registers, a given instruction selects the later write time, of the two source registers, from the register scoreboard 40 as the read time for the instruction. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, the add instruction has a latency time of 1, the multiply instruction has a latency time of 2, and the load instruction has a latency time of 3 assuming a data cache hit. In another example, if the current time count is 5 and the source registers of an add instruction receive write time counts of 22 and 24 from the register scoreboard 40, then the read time count is set at 24. In this case, the execution and the write time counts are both 25 for the add instruction. As shown in FIG. 1, the register scoreboard 40 is coupled to the time-resource matrix 50 where the read, execute, and write times of an instruction access the time-resource matrix 50 to determine availability of the resources.

Figure 3:
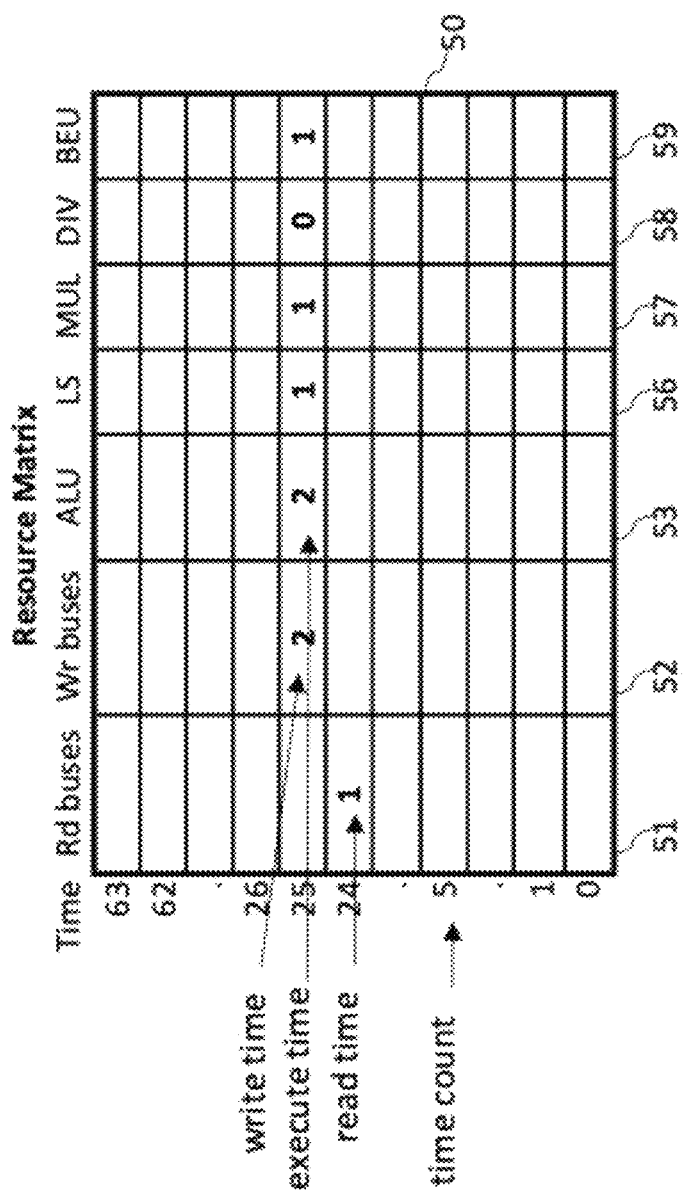
FIG. 3 is a block diagram illustrating a time-resource matrix.

FIG. 3 illustrates further details of the time-resource matrix 50. The time-resource matrix 50 preferably includes the same number of time entries to match the time counter 90. For example, if the time counter 90 is 64 cycles, then the time-resource matrix 50 has 64 entries. In one embodiment, the time counter is incremented every clock cycle and rotates back from the 63rd entry to the 0th entry. The columns in the time-resource matrix 50 represent the available resources for the read buses 51, the write buses 52, the ALUs 53, the load-store ports 56, the multiply unit 57, the divide unit 58, and the branch execution unit (BEU) 59. If other functional units are provided by microprocessor 10 those are also included in the resource matrix 50.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 correspond to the plurality of functional units 75 of FIG. 1. The load-port ports column 56 corresponds to the load-store unit 80 of FIG. 1.

FIG. 3 also shows an example of the information in the time-resource matrix 50. Shown is data with a read time count of 24, an execution time count of 25, and a write time count of 25. When an instruction accesses the time-resource matrix 50 for availability of resources, the matrix 50 shows that at read time 24, there is 1 available read bus, and at execution time 25, there are 2 available ALUs, 1 load-store port, 1 multiply unit, and 1 BEU for execution of instruction. At write time 25, there are 2 available write buses.

All available resources for a required time are read from the time-resource matrix 50 and sent to the instruction issue unit 55 for a decision of when to issue an instruction to the execution queue 70. If the resources are available at the required times, then the instruction can be scheduled and sent to the execution queue 70. The issued instruction updates the register scoreboard 40 with the write time and updates the time-resource matrix 50 to correspondingly reduce the available resource values. All resources must be available at the required time counts for the instruction to be dispatched to the execution queue 70. If all resources are not available, then the required time counts are incremented by one, and the time-resource matrix is checked as soon as the same cycle or next cycle. The particular number of read buses 66, write buses 68, and functional units 75 in FIG. 1 is preferably chosen to minimize stalling of instructions in the instruction issue unit 55.

One issue with simultaneous multithreading is hogging of critical resources by one thread. For example, a first thread can issue multiple consecutive load/store instructions to the load-store ports of the data cache 85. In such an instance, the load/store ports 56 of the time-resource matrix 50 will indicate that the load-store ports are busy for many cycles from load-store instructions from the first thread. The load-store instruction of the second thread will consequently be blocked for several cycles before it can be executed. In one embodiment, multiple resources of the same type can be dedicated or shared for the threads. For example, the first thread is restricted to the first load-store port 46 and the second thread is restricted to the second load-store port 46 of the time-resource matrix 50. Other combinations of resource sharing may be employed such as (1) a first thread is restricted to a first resource while a second thread is allowed to use both resources, (2) dedicated resource are provided for each thread and shared resources are provided for all threads, and (3) resource sharing between threads is dynamically enabled/disabled by writing to control and status registers (not shown). In the embodiment shown in FIG. 3, each resource, represented as a column in the time-resource matrix 50, is implemented independently and can be accessed as required or restricted by instruction and by thread, thereby permitting flexibility in permitting the various types of resource sharing described above. For example, the read buses 51 consists of 4 read buses and is implemented as 4 single bit registers with 64 entries. Based on the built-in or programmed restriction, the instructions from one thread can check for availability of the read buses on a number of restricted read buses 51 in the time-resource matrix 50. The disclosed embodiment does not limit any combination of resource sharing.

FIG. 4A illustrates a single read bus of the read control unit 62 and FIG. 4B a single write bus of the write control unit 64. The read control unit 62 and the write control unit 64 include a number of time entries to match the time counter 90. As mentioned above, in a preferred embodiment the time count is incremented every clock cycle. The columns in the read control unit 62 represent the source register 61 and a valid bit 63. The columns in the write control unit 64 represent the destination register 65 and a valid bit 67 in the write bus 65.

In the example illustrated in FIGS. 4A and 4B, at the time count of 25 in the read control unit 62 the register x5 from the register field 61 of the read control 62 is used to read the entry 5 from the register scoreboard 40 for the "Wr time" 46 and the "Funit" 44. If the write time 46 is the same as the time count 90, then the result data is written back to the register file 60 in the same clock cycle. The result data from the "Funit" 44 can be forwarded to the read bus 66 instead of being read from the register file 60. The write time 46 may have changed due to a cache miss of the load instruction, in which case the instruction cannot be executed yet because the source operand data is not valid. The RAW dependent instruction is rescheduled to be executed at later time. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 provides centralized control for the read buses 66, thus reducing complexity from the hundreds of instructions in dynamic scheduling architectures.

Similarly in FIG. 4B, the register x5 from the register field 65 of the write control unit 64 at time count of 26 is used to write to the register file 60. The register x5 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. In one embodiment, the valid (valid bit field 67) register 65 of write control unit 64 is responsible to clear the valid bit 42 from the register scoreboard 40 of FIG. 2 if the corresponding "Wr time" field 46 is the same as the time count 90. It is possible that the write time 46 of the register scoreboard 40 has been modified due to delay in write time. An alternative is to compare time count to all "Wr time" fields 46 of the register scoreboard 40 and to clear the valid bit 42 for matching times. This alternative results in high power consumption if for example, there are 100 registers in the register scoreboard 40. The write control unit 64 operates as a centralized control for the write buses 68 which removes complexity compared to distributing such control among the plurality of functional units in dynamic scheduling.

Figure 5:
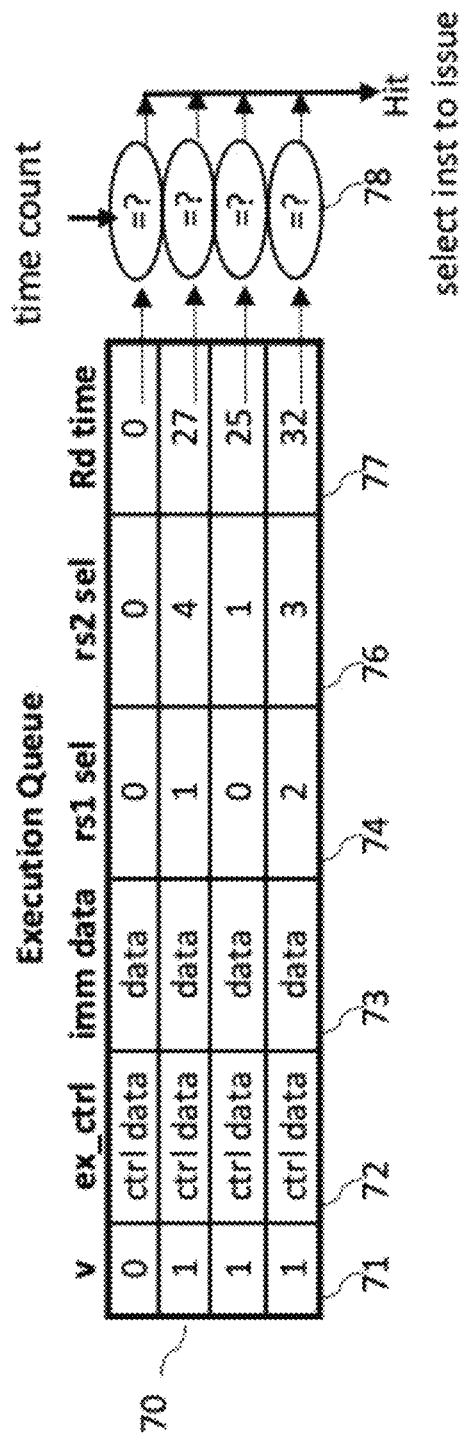
FIG. 5 is a block diagram illustrating an execution queue.

FIG. 5 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction waiting for execution by one of the functional units 75 or the load/store unit 80 according to the time count in the read time column 77. Each entry in the execution queue 70 preferably consists of the following fields: the valid bit 71, control data 72, the immediate data 73, the first source register select 74, the second source register select 76, and the read time 77. The valid bit 71, when set to "1," indicates that the entry is valid in the execution queue 70. The control data 72 specifies the specific operation to be used by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74 and 76 may not be used for some instructions.

The read control 62 reads the register scoreboard 40 to ensure that the expected source operand data is still valid and is synchronized with the execution queue 70 to supply source data to the functional unit 75. If the write time 46 from the scoreboard 40 is modified to be greater than the time count 90, then the synchronized instruction in the execution queue 70 is replayed instead of going to the functional unit 75. In one embodiment, the replay instruction uses the new write time from the register scoreboard 40 to calculate the new read time, execution time, and write time for accessing the time resource matrix 50 to reissue the instruction. The procedure is the same as for instructions in the instruction issue unit 55.

Note that the destination register can be, but does not need to be, kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 5, the entries are issued to the functional units out-of-order. The read time field 77 indicates that the second entry is issued at time count 25, the third entry is issued at time count 27, and the first entry is issued at time count 32.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. Furthermore, the invention is not limited to integer functional units. In other embodiments the functional units include floating point units, digital-signal processing units, vector processing units, or custom designed units.

The described operations of FIGS. 2-5 are the same for a single thread microprocessor or a multithreaded microprocessor 10. The static scheduling of instructions in a microprocessor with a time counter 90 simplifies the design of multithreaded microprocessor. One type of multithreaded microprocessor is known as a Simultaneous MultiThreaded (SMT) where instruction(s) from each thread are alternately dispatched from the instruction fetch unit 20 to the instruction decode unit 30. The SMT is perhaps the most difficult multithreaded type to implement in a traditional OOO superscalar microprocessor but adds no complexity to the issue and execution pipeline of the static scheduling microprocessor 10 disclosed herein. The required architecture registers and states for multithreading are duplicated as necessary for any SMT implementation.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A multithreaded processor comprising:
   a time counter comprising an N-bit counter from a zero count to an Nth-bit count value, which represents a largest future time for an instruction issue unit to issue an instruction, the time counter storing a time count representing a current time of the processor, wherein the time count is incremented with each clock cycle of a clock circuit and wherein the N-bit counter returns to the zero count after reaching the Nth-bit count value;
   an instruction issue unit coupled to the time counter for receiving a first instruction from a first thread, and issuing the first instruction with a preset execution time based on the time count; and
   an execution queue coupled to the time counter and the instruction issue unit to receive the first instruction of the first thread from the instruction issue unit and dispatch the first instruction to a functional unit for processing by the functional unit at the preset execution time.

2. The processor of claim 1 further comprising a register scoreboard storing a write time of a first register in a register file, wherein the write time represents a future time relative to the time count wherein the register file includes registers for renaming all architectural registers of all threads supported by the processor, and temporary registers.

3. The processor of claim 2 further comprising an instruction decode unit coupled to the register scoreboard wherein the instruction decode unit reads a write time for each source operand of a first instruction from the register scoreboard, and uses each write time to determine an execution time for the first instruction.

4. The processor of claim 3 further comprising a time-resource matrix unit coupled to the register scoreboard and the time counter for storing information relating to available resources for at least some time counts of the N-bit time counter, and wherein the available resources include at least one of: a plurality of read buses, a plurality of write buses, and a plurality of functional units.

5. The processor of claim 4 wherein an available resource is dedicated to the first thread or shared with the second thread.

6. The processor of claim 5 wherein the instruction issue unit is coupled to the time resource matrix unit to receive data therefrom and to issue an instruction if all the resources indicated by the time-resource matrix are available, and to stall the instruction if any of the resources is not available.

7. The processor of claim 1 further comprising:
   a read control unit storing a first register of a register file with time count entries, and
   for each entry therein storing a forwarding valid bit to indicate when the corresponding entry may be read and transported on a read bus.

8. The processor of claim 7 further comprising a write control unit storing a second register of the register file with time count entries to indicate when result data are transported from a write bus and written to the second register of the register file.

9. The processor of claim 8 wherein the execution queue stores a plurality of instructions, and wherein each instruction includes a read time which is a future time relative to the time count.

10. The processor of claim 9 wherein the read control unit is synchronized with the read time in the execution queue.

11. The processor of claim 8 wherein the execution queue dispatches instructions to at least one functional unit.

12. A multithreaded processor comprising:
   a clock circuit;
   a time counter storing a time count representing a current time of the processor, wherein the time count is incremented with each cycle of the clock circuit;

an instruction issue unit coupled to the time counter for receiving a first instruction of a first thread, and issuing the first instruction with a preset execution time based on the time count;

an execution queue coupled to the time counter and the instruction issue unit to receive the first instruction of the first thread, and dispatch the first instruction to a functional unit when the time count matches the preset execution time;

a register scoreboard storing a write time of a selected register from a plurality of registers in a register file, wherein the write time is a future time specified by the time count, wherein the register file includes registers for renaming architectural registers of all thread and temporary registers;

an instruction decode unit coupled to the register scoreboard in which the instruction decode unit reads write times for source operands of the first instruction from the register scoreboard, and uses the write times to determine an execution time for the first instruction;

a time-resource matrix coupled to the register scoreboard and the time counter for storing information relating to available resources for each time count of the time counter, and wherein the available resources include at least one of: a plurality of read buses, a plurality of write buses, and a plurality of functional units.

13. A method, executed within a processor, for reading a register scoreboard for write times of registers in a register file, the method comprising:

determining an execution time of a first instruction;

issuing the first instruction of a first thread to an execution queue in the processor to execute at a future time wherein the future time based on a write time is obtained from the register scoreboard; and issuing a second instruction of a second thread to an execution queue in a processor to execute at a future time wherein the future time based on a write time is obtained from the register scoreboard;

wherein the execution time represents a time from a time counter which is incremented with each clock cycle of a clock circuit from a zero count to an Nth-bit count value, which represents a largest future time for issuance of an instruction, the time counter storing a time count representing a current time of the processor, and wherein the N-bit counter returns to the zero count after reaching the Nth-bit count value.

14. The method of claim 13 wherein the maximum time count value that the time counter can reach corresponds to the latest future time at which the first instruction is able to be issued.

15. The method of claim 14 further comprising storing a write time of a first register from a plurality of registers of a register file wherein the write time represents a future time based on the time count wherein the register file includes registers for renaming architectural registers of all thread and temporary registers.

16. The method of claim 15 further comprising storing information corresponding to available resources for each time count in a time-resource matrix, wherein the resources comprise at least one of a plurality of read buses, a plurality of write buses, and a plurality of functional units.

17. The method of claim 16 further comprising storing a second register of the register file in a read control unit, wherein the second register is read from the register file and transported on a read bus.

18. The method of claim 17 further comprising storing a third register of the register file in a write control unit wherein result data are transported from a write bus and written to the third register of the register file.

19. The method of claim 13 further comprising storing a plurality of instructions in an execution queue wherein each of the plurality of instructions includes a read time based specified by the time count.

20. The method of claim 19 further comprising synchronizing the read time of the execution queue with a read bus control unit.

21. The method of claim 17, wherein the execution queue dispatches the first instruction to one of a plurality of functional units.

22. The multithreaded processor of claim 12, wherein,
the instruction issue unit receives a second instruction of a second thread, and issues the second instruction with a second preset execution time based on the time count; and
the execution queue receives the second instruction of the second thread, and dispatches the second instruction to a second functional unit when the time count matches the preset second execution time.

23. The processor of claim 1 further comprising:
a register scoreboard coupled to the time counter to record a write back time of a first destination register referenced by the first instruction of the first thread and a write back time of a second destination register referenced by a second instruction of a second thread;
wherein the instruction issue unit is coupled to the register scoreboard for receiving a third instruction from the first thread, wherein a source register referenced by the third instruction of the first thread is the same as the first destination register that is referenced by the first instruction of the first thread, and the wherein instruction issue unit issues the third instruction of the first thread with a first preset execution time based on the write back time of the first destination register, that is referenced by the first instruction of the first thread;
wherein the instruction issue unit receives a fourth instruction from the second thread, wherein a source register referenced by the fourth instruction of the second thread is the same as the second destination register, that is referenced by the second instruction of the second thread, and the instruction issue unit issues the fourth instruction of the second thread with a second preset execution time based on the write back time of the second destination register, that is referenced by the second instruction of the second thread; and
wherein the execution queue receives the third instruction of the first thread and the fourth instruction of the second thread from the instruction issue unit and dispatches the third instruction to the functional unit for processing by the functional unit at the first preset execution time, and further dispatches the fourth instruction to the functional unit for processing by the functional unit at the second preset execution time.

* * * * *